(12) United States Patent
Seo et al.

(10) Patent No.: US 6,552,761 B1
(45) Date of Patent: Apr. 22, 2003

(54) BACK LIGHT FOR A LIQUID CRYSTAL DISPLAY DEVICE

(75) Inventors: Seung Ju Seo, Kumi-shi (KR); Young Woo Park, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/552,516

(22) Filed: Apr. 19, 2000

(30) Foreign Application Priority Data

Apr. 19, 1999 (KR) .............................. 99-13815

(51) Int. Cl.[7] ..................... G02F 1/1333; G02F 1/1335; G01D 11/28; F21V 7/04
(52) U.S. Cl. ........................ 349/58; 349/65; 362/26; 362/31
(58) Field of Search ............................. 349/58, 65, 187, 349/113; 362/26, 31

(56) References Cited

U.S. PATENT DOCUMENTS 6,175,396 B1 * 1/2001 Kim et al. .................... 349/58
6,199,987 B1 * 3/2001 Haba et al. ................... 349/57
6,392,724 B2 * 5/2002 An et al. ...................... 349/58

* cited by examiner

*Primary Examiner*—Robert H. Kim
*Assistant Examiner*—Jeanne A. Di Grazio
(74) *Attorney, Agent, or Firm*—McKenna Long & Aldridge LLP

(57) ABSTRACT

An apparatus for fixing an optical film used in a back light to an outer frame of the back light. In the back light, a protrusion protrudes from a frame rim of the outer frame. A film extension extends from one side edge of the optical film and is placed on the surface of the frame rim near the protrusion. A clip is provided with a hole for inserting the protrusion to be mounted onto the frame rim such that the protrusion is inserted into the hole, thereby fixing the film extension of the optical film onto the frame rim.

12 Claims, 3 Drawing Sheets

BACK LIGHT FOR A LIQUID CRYSTAL DISPLAY DEVICE

BACKGROUND OF THE INVENTION

1. Field of the Invention

This invention relates to a back light for a liquid crystal display device, and more particularly to an apparatus for fixing an optical film to the outer frame of the back light.

2. Description of the Related Art

Basically, a liquid crystal display device that has been widely used for a display device such as a notebook computer or a portable television, etc., includes an upper plate and a lower plate, a liquid crystal panel consisting of a liquid crystal layer provided between the upper plate and the lower plate, and a back light installed at the lower surface of the lower plate to provide a uniform light source.

Generally, as shown in FIG. 1, the back light of the liquid crystal display includes an outer frame (or main supporter) 1, a light-conductive plate 2 installed within the outer frame 1, a reflecting film 3 provided in opposition to the lower surface of the light-conductive plate 2; and a lower diffusion film 4, a lower prism film 5, an upper prism film 6, and an upper diffusion film 7 that are disposed on the upper surface of the light-conductive plate 2. The light-conductive plate 2 converts light generated from a light source installed at one side of the outer frame 1 into light emerging from an upper face of the light-conductive plate 2. The reflecting film 3 reflects incident light from the lower surface of the light-conductive plate 2, back toward the light-conductive plate 2. The lower diffusion film 4 diffuses light passing through the upper surface of the light-conductive plate 2 into the entire surface of the back light. The lower prism film 5 and the upper prism film 6 converge light received from the lower diffusion film 4 into a desired direction by their polarization characteristics. The upper diffusion film 7 diffuses light passing through the upper prism film 6, again, and protects the upper prism film 6. Pads 8 are attached to the edges of the upper surface of the upper diffusion film 7. The pads 8 are responsible for supporting a liquid crystal panel(not shown).

The four optical films 4, 5, 6 and 7 are adhered to double-face tapes 9 to be fixed to the outer frame 1. The upper diffusion film 7 is fixed onto the upper surfaces of the projections formed within the outer frame 1 with the aid of the double-face tapes 9, whereas the remaining three optical films 4, 5, and 6 are fixed to the side wall surfaces of the projections of the outer frame 1 with the aid of the double-face tapes 9.

The method of fixing the four optical films 4, 5, 6 and 7 using the double-face tape 9 in this manner causes the following problems. First, each of the optical films 4, 5, 6 and 7 requires a separate process of adhering the double-face tape 9 and a separate assembly process for fixing each of the optical films 4, 5, 6 and 7 to the outer frame. So the number of processes is the same as the number of optical films. For this reason, the assembly time of the back light is increased, and the defect rate is also increased to that extent. For instance, in the case of the back light as shown in FIG. 1, since four optical films 4, 5, 6 and 7 are provided, a process of adhering the double-face tape 9 to the optical films 4, 5, 6 and 7 is required to be performed four times, and an assembly process of fixing the optical films 4, 5, 6 and 7 also is required to be performed four times. Second, since a portion of the optical films 4, 5, 6 and 7 fixed with the aid of the double-face tape 9 and the pad 8 has a different expansion degree from the remaining unfixed portion thereof at a high temperature, wrinkles are generated at the optical films 4, 5, 6 and 7 at a high temperature.

SUMMARY OF THE INVENTION

Accordingly, it is an object of the present invention to provide a back light for a liquid crystal display device that is adapted to provide a reduce assembly time as well as preventing wrinkles from being generated at optical films at a high temperature.

In order to achieve these and other objects of the invention, a back light of a liquid crystal display device according to one aspect of the present invention includes a protrusion protruded from a frame rim of an outer frame; a film extension extended from one side edge of an optical film to be put on the surface of the frame rim near the protrusion; and a clip provided with a hole for inserting the protrusion to be mounted onto the frame rim in such a state that the protrusion has been inserted into the hole, thereby fixing the film extension of the optical film onto the frame rim.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
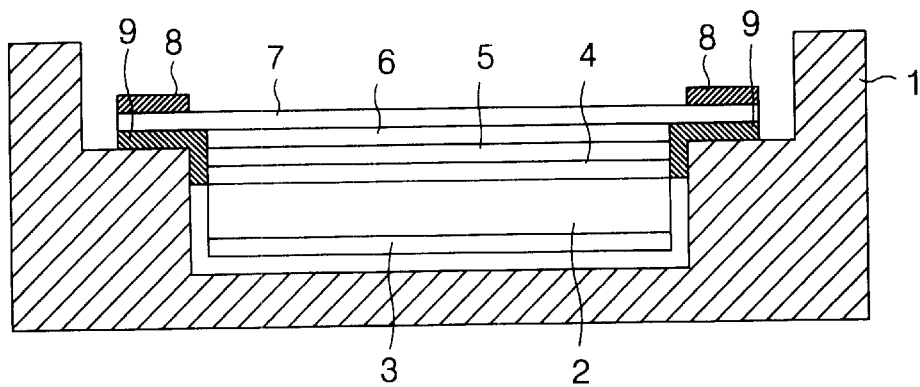
FIG. 1 is a sectional view showing the structure of a back light of a conventional liquid crystal display device.
Figure 2:
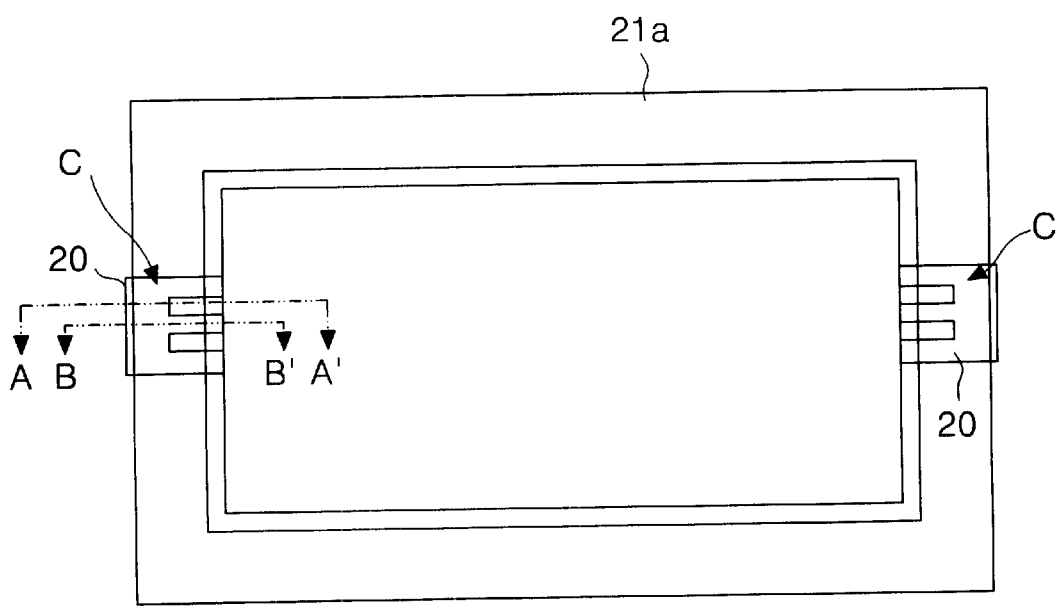
FIG. 2 is a plan view showing the structure of a back light of a liquid crystal display device according to an embodiment of the present invention.
Figure 3:
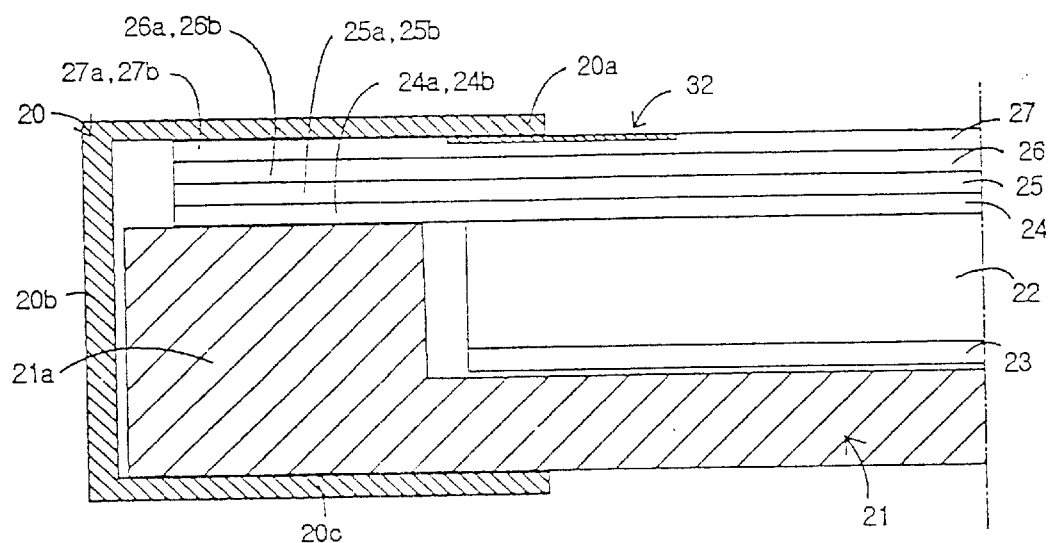
FIG. 3 is a section view of the back light taken along the line A–A' in FIG. 2.
Figure 4:
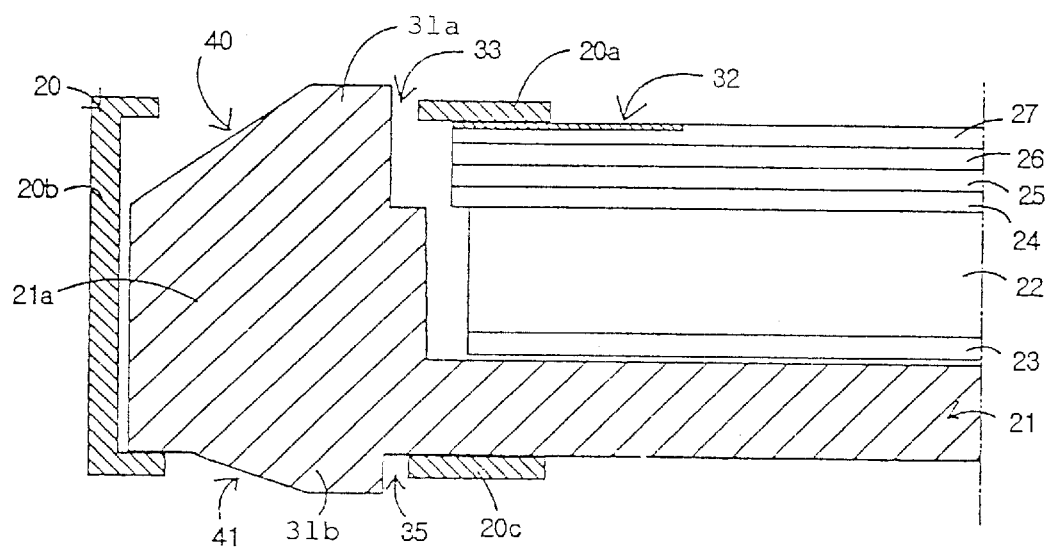
FIG. 4 is a section view of the back light taken along the line B–B' in FIG. 2.

Referring to FIG. 2 and FIG. 4, there is shown a back light of a liquid crystal display device according to an embodiment of the present invention. The back light of the liquid crystal display device includes an outer frame (or main supporter) 21, a light-conductive plate 22 installed within the outer frame 21, a reflecting film 23 provided in opposition to the lower surface of the light-conductive plate 22; and a lower diffusion film 24, a lower prism film 25, an upper prism film 26, and an upper diffusion film 27 that are disposed on the upper surface of the light-conductive plate 22, and a clip 20 engaged to the outer frame 21. The light-conductive plate 22 converts light generated from a light source (not shown) installed at one side of the outer frame 21 into light emerging from the upper face of the light-conductive plate 22. The reflecting film 23 reflects light incident, via the lower surface of the light-conductive plate 22, back toward the light-conductive plate 22. The lower diffusion film 24 diffuses a light passing through the upper surface of the light-conductive plate 22 into the entire surface of the back light. The lower prism film 25 and the upper prism film 26 converge light received via the lower diffusion film 24 into a desired direction by their polarization characteristics. The upper diffusion film 27 diffuses light passing through the upper prism film 26, again, and protects the upper prism film 26. Pads (not shown) are attached to the edges of the upper surface of the upper diffusion film 27. At the edges of the upper surface of the upper diffusion film 27, a black print layer 32 is provided for absorbing light leaking into the edges of the back light. The pads are responsible for supporting a liquid crystal panel (not shown). The clip 20 is engaged to the outer frame 21 to fix the four optical films 24, 25, 26 and 27.

Figure 5:
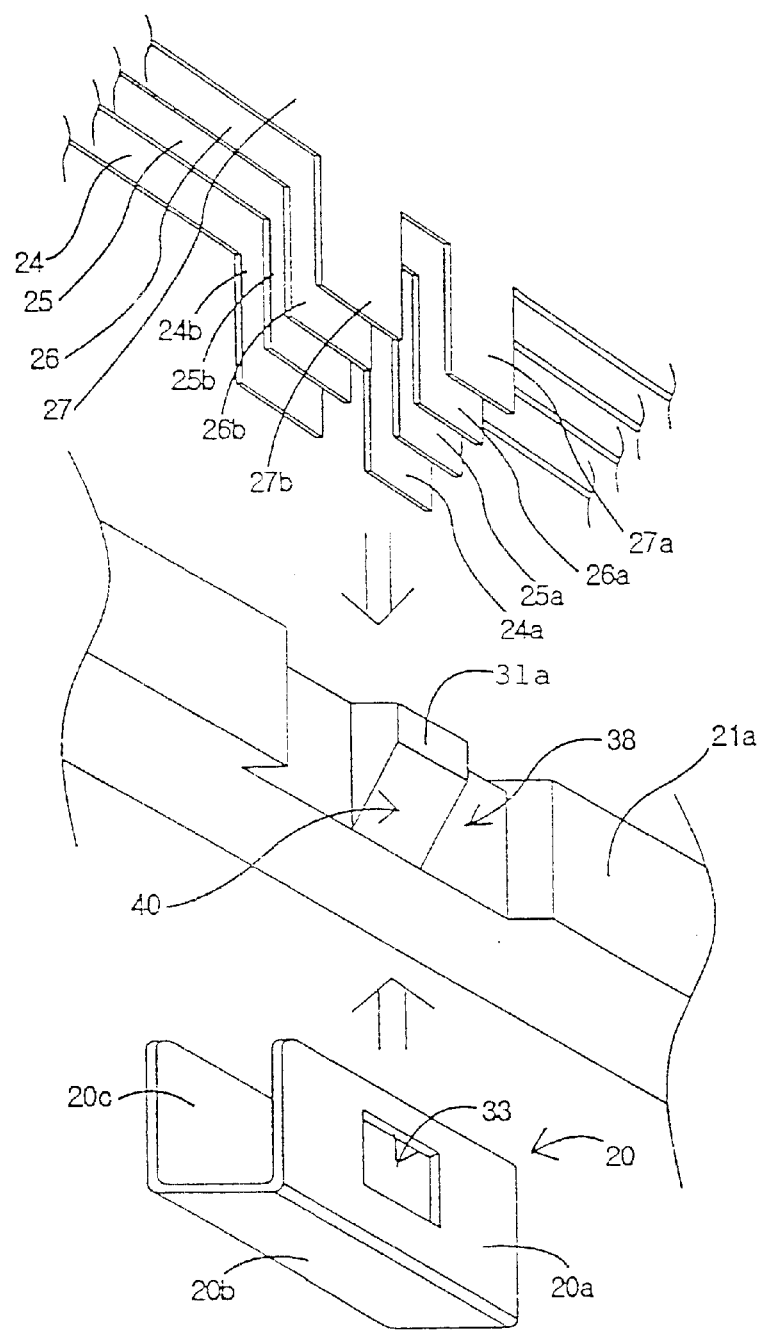
FIG. 5 is an exploded perspective view of the "C" portion in FIG. 2.

FIG. 5 shows the clip 20, a rim 21a of the outer frame 21 engaged with the clip 20, and a fixed portion of each of the optical films 24, 25, 26 and 27 secured by the clip 20 in detail. Referring now to FIG. 5, a frame rim 21a surrounding the edges of the light-conductive plate 22 is provided at the outer frame 21. A hole 38 is formed in a portion of the upper surface of the frame rim 21a. An upper protrusion 31a and a lower protrusion are formed at the center of the hole 38 and the lower surface of the frame rim 21a corresponding thereto, respectively. The upper protrusion 31a has a greater height than the lower protrusion 31b. The inner surfaces of the upper protrusion 31a and the lower protrusion 31b are formed perpendicularly to the light-conductive plate 22; while the outer surfaces thereof are provided with slopes 40 and 41 that are formed obliquely at a certain angle of inclination. By these slopes, the upper protrusion 31a and the lower protrusion 31b each have a larger thickness as they get closer to the light-conductive plate 22.

At one side of the optical films 24, 25, 26 and 27 opposed to the hole 38 in the frame rim 21a, first extensions 24a, 25a, 26a and 27a and second extensions 24b, 25b, 26b and 27b extended, in parallel, from the outside thereof are formed.

The clip 20 is made from a material such as metal or plastic and manufactured by press works and molding. A plastic with a lower thermal conductivity than metal is preferably used as a material for the clip 20 so as to reduce heat transferred into the optical films 24, 25, 26 and 27. This clip 20 has a side connecting part 20b, and an upper fixing part 20a and a lower fixing part 20c that are perpendicularly formed in parallel above and under the side connecting part 20b, respectively. The upper fixing part 20a is provided with an upper square hole 33 into which the upper protrusion 31a formed on the frame rim 21a is inserted. The lower fixing part 20c is provided with a lower square hole 35 into which the lower protrusion 31b formed on the frame rim 21a is inserted.

A process of securing the optical films 24, 25, 26 and 27 with the clip 20 will be described below. The optical films 24, 25, 26 and 27 are aligned such that the first extensions 24a, 25a, 26a and 27a and the second 24b, 25b, 26b and 27b as described above are placed in the hole 38 with the upper protrusion 31a on the frame rim 21a therebetween. Subsequently, the clip 20 is pulled into the hole 38 in such a state that the first and second extensions 24a, 25a, 26a, 27a, 24b, 25b, 26b and 27b of the optical films 24, 25, 26 and 27 have been put on the hole 38 in the frame rim 21a. Then, the upper protrusion 31a and the lower protrusion 31b formed on the frame rim 21a are inserted into the upper square hole 33 and the lower square hole 35 in the clip 20, respectively. At this time, the respective slopes 40 and 41 of the upper and lower protrusions 31a and 31b guide the clip 20 in such a manner that the clip 30 is smoothly engaged to the upper and lower protrusions 31a and 31b of the frame rim 21a. If the clip 20 is engaged in such a state that the first and second extensions 24a, 25a, 26a, 27a, 24b, 25b, 26b and 27b of the optical films 24, 25, 26 and 27 have been put on the hole 38, then the extensions 24a, 25a, 26a, 27a, 24b, 25b, 26b and 27b are pressed by the upper and lower fixing parts 20a and 20c of the clip 20 to thereby be secured between the hole 38 in the frame rim 21a and the clip 20.

Both of the upper and lower protrusions 31a and 31b and the upper and lower square holes 33 and 35 for securing the clip 20 onto the frame rim 21a need not be necessarily provided as described, but the upper protrusion 31a and the upper square hole 33 only may be provided, if necessary. Also, it is not necessary to provide the hole 38 formed on the frame rim 21a. In other words, since the optical films 24, 25, 26 and 27 can be fixed as long as the upper protrusion 31 of the frame rim 21a is inserted into the upper square hole 33 in the clip 20, the hole 38 may be omitted. In addition, it is possible to provide only any one of the first and second extensions 24a, 25a, 26a, 27a, 24b, 25b, 26b and 27b and to fix one extension to the frame rim 21a.

As described above, according to the present invention, the extensions are provided at one side of the optical films, and are fixed to the outer frame provided with the back light with the aid of the clip. Accordingly, in the back light of the liquid crystal display device according to the present invention, a number of optical films are fixed to the outer frame by just a single clip mounting process without using the double-face tape, so that the number of back light assembly processes can be reduced and hence the manufacturing cost can be reduced to that extent. Furthermore, the back light of the liquid crystal display device according to the present invention fixes the optical films using the clip with a low thermal conductivity, thereby preventing wrinkles of the optical films generated at a high temperature. Moreover, according to the present invention, the clip is positioned at the edges of the optical films to support the liquid crystal panel under it instead of the conventional pad. Accordingly, the manufacturing cost can be not only reduced due to a reduction in the number of components, but also the pad assembly process can be omitted to reduce the assembly time.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A back light of a liquid crystal display device including an outer frame provided with a frame rim surrounding edges of a light-conductive plate, and a first optical film installed in opposition to a light-emitting surface of the light-conductive plate, said back light comprising:

a first protrusion protruding from a surface of the frame rim of the outer frame;

a second protrusion protruding from an opposite surface of the frame rim as the surface from which the first protrusion protrudes;

a first film extension extending from one side edge of the first optical film and placed on a surface of the frame rim near the protrusion; and a clip provided with a hole, wherein the first protrusion is inserted into the hole, and the clip is mounted onto the frame rim, fixing the first film extension of the optical film onto the frame rim.

2. The back light according to claim 1, further comprising a second optical film disposed above the first optical film in opposition to the light-emitting surface of the light-conductive plate.

3. The back light according to claim 2, wherein said first optical film comprises a diffusion film and said second optical film comprises a prism film.

4. The back light according to claim 1, wherein one side of the first protrusion opposed to a direction in which the clip is mounted is defined by a slope with an inclined angle.

5. The back light according to claim 1, wherein said frame rim is provided with a hole into which the first film extension is placed, and said first protrusion is formed at one side of the hole.

6. The back light according to claim 1, wherein said clip comprises:

a side connecting part opposed to the side surface of the frame rim;

an upper fixing part extending perpendicularly from the side connecting part to be fastened to a lower surface of the frame rim.

7. The back light according to claim 6, wherein said clip comprises a lower fixing part having a second hole defined therein for inserting the second protrusion thereinto.

8. The back light according to claim 1, further comprising a second film extension separated from and extending in parallel to the first film extension.

9. The back light according to claim 1, wherein said clip is made from any one of a metal and a plastic.

10. The back light according to claim 1, wherein said clip supports a liquid crystal panel into which a liquid crystal is injected.

11. A back light, comprising:

a light-conductive plate;

a clip having upper and lower holes;

an outer frame having a lower and vertical protrusions and two holes adjacent said vertical protrusion;

wherein said vertical protrusion has two perpendicular sidewalls, two angled sidewalls and a top surface; and optical films within said outer frame having two parallel extensions separated by an opening;

wherein said parallel extensions are arranged within the holes; and wherein the optical films are secured to the outer frame by inserting the upper and lower protrusions of the outer frame through the upper and lower holes of the clip.

12. The back light, of claim 11, wherein the clip is made from material selected from anyone of metal and plastic.

* * * * *